No. 851,208. PATENTED APR. 23, 1907.
O. SVANSTRÖM.
WHEEL RIM.
APPLICATION FILED NOV. 1, 1906.
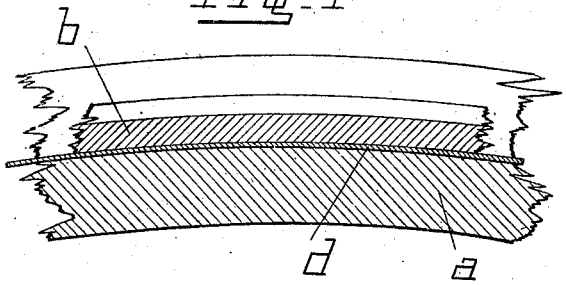
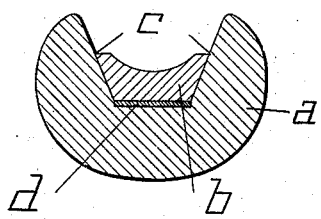
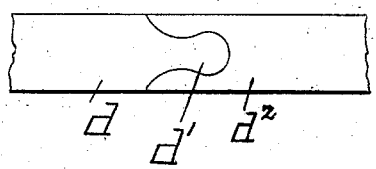
Witnesses. Inventor.

UNITED STATES PATENT OFFICE.

OLOF SVANSTRÖM, OF STOCKHOLM, SWEDEN.

WHEEL-RIM.

No. 851,208.  Specification of Letters Patent.  Patented April 23, 1907.

Application filed November 1, 1906. Serial No. 341,621.

*To all whom it may concern:*

Be it known that I, OLOF SVANSTRÖM, a subject of the King of Sweden, residing at Stockholm, Sweden, have invented certain new and useful Improvements in Wheel-Rims; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in the manufacture of wheel-rims especially adapted for use on bicycles.

It has heretofore been customary to secure in the concave face of the concavo-convex rim a correspondingly shaped outer rim which receives the pneumatic tire. It has however generally been so arranged that the outer edges of both sections lay outside that surface of the pneumatic tire which lays against the rim, consequently the joint is exposed to knocks, dirt, dampness etc.

The object of the present invention is to provide means for attaining a substantial reinforcement of the rim so that the pressure, arising on account of the tension of the spokes used in a bicycle wheel, may be received by the rim without its being deformed or destroyed and at the same time doing away with the before mentioned drawback.

In the accompanying drawing, Figure 1 is a longitudinal section of a portion of a rim constructed according to my invention. Fig. 2, a cross section, and Fig. 3, a detail plan view of one part of the rim.

The inner part of the wheel rim comprises a ring $a$ preferably of wood, the inner periphery of which is convex as shown in Fig. 2. In the outer periphery of this ring is formed a channel having a bottom straight in cross section and side walls diverging therefrom. A strip $b$ having a concave outer face and conforming to the configuration of the groove, is secured therein preferably by glue. The side walls of the strip $b$ are not as high as the walls of the channel and consequently a sufficiently deep channel is formed for the reception of the pneumatic tire which, when in place, projects over the joints $c$, $c$, thus protecting the same from injury.

A tire $d$, preferably of metal, is interposed between the bottom of the channel and the inner face of the strip $b$. The two ends of the tire are interlocking and are preferably formed in the manner shown in Fig. 3, *i. e.*, one end being provided with a curved tongue $d'$ which fits into a correspondingly shaped recess $d^2$ in the other end. When the tire is laid on the bottom of the channel the side walls thereof prevent the recessed end of the tire from spreading laterally so that any longitudinal strain will not separate the two ends which may be further secured together by soldering.

I claim:—

1. A wheel-rim comprising a ring having a channel formed in its outer periphery provided with diverging side walls, a tire seated in the channel, and a strip having sides parallel to the sides of the channel terminating below the outer edges of the latter for the purpose specified.

2. A wheel-rim comprising a ring provided with a channel formed in its outer periphery having its bottom straight in cross section and diverging side walls, a metal tire covering said bottom, and a ring having its inner periphery conforming to the tire and its sides parallel to the sides of the channel and terminating below the outer edges of the latter, for the purpose specified.

3. A wheel-rim comprising a ring provided with a channel formed in its outer periphery having its bottom straight in cross section and diverging side walls, a metal tire covering said bottom, having interlocking ends and a ring having a concave outer periphery and an inner periphery conforming to the tire and its sides parallel to the sides of the channel and terminating below the outer edges of the latter, for the purpose specified.

In testimony that I claim the foregoing as my invention, and have signed my name in presence of two subscribing witnesses.

OLOF SVANSTRÖM.

Witnesses:
 CARL FRIBERG,
 GUSTAF ALSON.